US006118500A

United States Patent [19]

Kunzman

[11] Patent Number: 6,118,500

[45] Date of Patent: Sep. 12, 2000

[54] DRAM BIT-PLANE BUFFER FOR DIGITAL DISPLAY SYSTEM

[75] Inventor: Adam J. Kunzman, Carrollton, Tex.

[73] Assignee: Texas Instruments Incorporated, Dallas, Tex.

[21] Appl. No.: 08/968,744

[22] Filed: Aug. 28, 1997

[51] Int. Cl.[7] .......... G02F 1/00

[52] U.S. Cl. .......... 348/771; 348/792; 345/84

[58] Field of Search .......... 348/771, 790, 348/792, 800, 714, 715, 716, 770; 711/105; 345/84

[56] References Cited

U.S. PATENT DOCUMENTS

| | | | |
|---|---|---|---|
| 5,254,980 | 10/1993 | Hendrix et al. | 345/84 |
| 5,255,100 | 10/1993 | Urbanus | 348/770 |
| 5,452,024 | 9/1995 | Sampsell | 348/771 |
| 5,488,431 | 1/1996 | Gove et al. | 348/716 |
| 5,663,749 | 9/1997 | Farris et al. | 348/771 |

*Primary Examiner*—John K. Peng
*Assistant Examiner*—Trang U. Tran
*Attorney, Agent, or Firm*—Charles A. Brill; Wade James Brady, III; Frederick J. Telecky, Jr.

[57] ABSTRACT

A formatter and frame buffer unit (20) for a display system (10) that uses a spatial light modulator (16) to display data formatted in bit-planes. Formatters (21) convert multi-bit pixel data to bit-plane data. The frame buffer memory (25) is comprised of conventional DRAM devices. To allow the use of DRAMs, formatters (21) operate on a number of consecutive pixels, the number of pixels being sufficient for an extended page mode form of addressing the DRAMs.

7 Claims, 3 Drawing Sheets

DRAM BIT-PLANE BUFFER FOR DIGITAL DISPLAY SYSTEM

TECHNICAL FIELD OF THE INVENTION

The present invention relates generally to display systems that use spatial light modulators, and more particularly, to formatting and storing data for delivery to the spatial light modulator.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for projection display applications. The images provided by a DMD compare favorably with those provided by CRTs and can be projected to a screen in dimensions surpassing today's large screen televisions.

A DMD has an array of micro-mechanical display elements, each having a tiny mirror that is individually addressable by an electronic signal. Depending on the state of its addressing signal, each mirror tilts so that it either does or does not reflect light to the image plane, thereby modulating light incident on the DMD. The mirrors may be generally referred to as "display elements", which correspond to the pixels of the image that they generate. Generally, displaying pixel data is accomplished by loading memory cells connected to the display elements. Each memory cell receives one bit of data representing an on or off state of the display. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

For all types of SLMs, motion displays are achieved by updating the data in the SLM's memory cells at sufficiently fast rates. To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, if images are displayed 60 frames per second, each frame lasts for approximately 16.7 milliseconds. Then, the intensity resolution for each pixel is established. In a simple example, and assuming n bits of resolution, the frame time is divided into $2^n-1$ equal time slices. For a 16.7 millisecond frame period and n-bit intensity values, the time slice is $16.7/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the PWM example described in the preceding paragraphs, during a frame, each bit-plane is separately loaded and the display elements are addressed according to their associated bit-plane values. For example, the bit-plane representing the LSBs of each pixel is displayed for 1 time slice, whereas the bit-plane representing the MSBs is displayed for 2n/2 time slices.

Existing memories for storing data for delivery to the SLM have special purpose architectures. VRAM (video RAM) devices are row-addressable and can be combined with external logic for formatting. DMDRAM devices are ASICs having both data storage and format capability. An example of a DMDRAM is described in U.S. Pat. Ser. No. 08/333,199 (Atty Dkt No. TI-17869), entitled "Memory Architecture for Reformatting and Storing Display Data in Standard TV and HDTV Systems", assigned to Texas Instruments Incorporated.

SUMMARY OF THE INVENTION

One aspect of the invention is a format and frame buffer unit operable to deliver bit-plane data to a spatial light modulator. A pair of formatters convert pixel data into bit-plane data. More specifically, each formatter receives multi-bit pixel data for N number of pixels and outputs N bits of the same weight. The formatters operate in a "double buffer" mode, in that one outputs the N number of bits while the other formatter receives a next N number of pixels. A first multiplexer selects between outputs of the two formatters, and a second multiplexer divides the N number of bits into bit-plane words. A DRAM controller converts the bit-plane words into the proper size for input to the frame buffer, and controls memory addressing. The frame buffer is comprised of a pair of DRAM memories, which also operate in a "double buffer" mode. Each memory has a number of pages, each page having a size determined by a memory input word size times a number of columns. Thus, each memory is addressable by specifying a page and a column. The memory input word size is determined by a desired data rate and by the size of N, where N is sufficiently large such that extended page mode addressing can be used to write the N number of bits to different columns of the same page.

An advantage of the invention is that it permits frame buffer memories for spatial light modulators to be based on conventional DRAM memory chips. This reduces costs and permits efficient use of DRAMs for varying display resolutions and pixel resolutions. It also permits the spatial light modulator to be addressed with finer granularity—blocks of rows can be accessed whereas other methods permit access only on a row-by-row basis.

DETAILED DESCRIPTION OF THE INVENTION

Overview of SLM-Based Projection Display System

Figure 1:
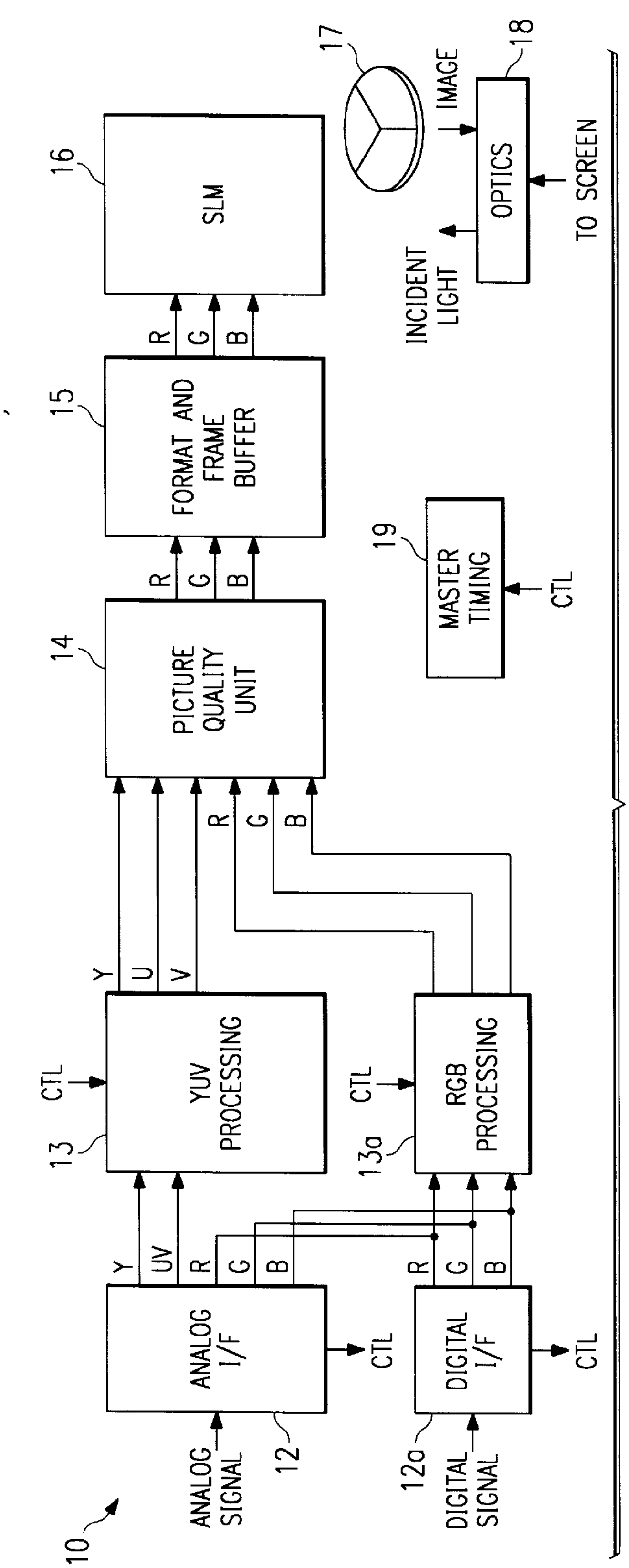
FIG. 1 is a block diagram of a projection display system, which uses a spatial light modulator to generate full-color full-motion displays, and which has a format and frame buffer unit in accordance with the invention.

FIG. 1 is a block diagram of a projection display system 10, which uses a spatial light modulator (SLM) 16 to generate full-motion images from a YUV or an RGB video signal. Only those components significant to main-screen pixel data processing are shown. Other components, such as might be used for processing synchronization and audio signals or secondary screen features, such as closed captioning, are not shown.

For purposes of this description, system 10 has a DMD-type SLM 16. Comprehensive descriptions of DMD-based digital display systems, without features of the present invention, are set out in U.S. Pat. No. 5,079,544, entitled "Standard Independent Digitized Video System", in U.S. Pat. Ser. No. 08/147,249, entitled "Digital Television System", and in U.S. Pat. No. 5,452,024, entitled "DMD Display System". Each of these patents and patent applications is assigned to Texas Instruments Incorporated, and each is incorporated by reference herein. System 10 could also be used with other types of SLMs that have operating characteristics similar to DMDs, notably, the use of bit-plane data.

System 10 is capable of receiving input signals from a variety of sources. The input may be analog, resulting in YUV or RGB data, or digital, resulting in RGB, data. Each type of data has its own front-end data path, comprised of a signal interface 12 or 12*a* and a processing unit 13 or 13*a*.

Referring to the specific components of FIG. 1, analog interface 12 receives an analog video signal, such as an NTSC, PAL, SECAM, or 4.43 NTSC signal. These signals arrive as interlaced fields, with alternating fields of even rows and odd rows. Each of these signals results in color difference (YUV) data. As indicated in FIG. 1, it is also possible that the analog input signal could be an RGB signal, resulting in RGB data. In this case, the analog interface 12 would provide RGB data to RGB-data processing unit 13*a* rather than to YUV processing unit 13.

Analog interface 12 detects the type of input signal, and delivers a control signal to timing unit 19 to indicate the field rate, line rate, and sample rate. It also delivers a control signal to YUV-data processing unit 13 (for YUV data) or to RGB-data processing unit 15 (for RGB data), for selecting the appropriate processing for that type of signal. Analog interface 12 separates video, synchronization, and audio signals. It includes components for A/D conversion and Y/UV separation, by which the signal is converted to pixel-data samples and the luminance ("Y") data is separated from the chrominance ("UV") data. The signal may be converted to digital data before Y/UV separation, or Y/UV separation could be performed before A/D conversion. Regardless of the order of Y/UV separation and A/D conversion, the output is referred to herein as "YUV data" and is comprised of data representing luminance and chrominance information.

YUV-data processing unit 13 prepares the YUV data for display, by performing various data processing tasks. Processing unit 13 may include whatever processing memory is useful for such tasks, such as field and line buffers. The tasks performed by processing unit 13 include conversion from interlaced to progressive scan format (proscan), scaling, and sharpness control. Interlaced to progressive scan conversion operates on interlaced fields of input data, and generates new data to fill in odd lines of even fields and even lines of odd fields. Scaling is the process of changing image resolution, with horizontal scaling changing the number of active pixels per line and vertical scaling changing the number of active lines per frame.

If the input signal is digital data, a digital interface 12*a* receives the data and detects the type of input signal. It delivers a control signal to timing unit 19 indicating the frame rate and horizontal and vertical resolution, as well as a control signal to RGB-data processing unit 13*a* to select the appropriate processing. It also performs whatever buffering and timing tasks are needed to prepare the data for processing. This data is assumed to be progressively scanned RGB data, such as are the VGA and SVGA formats.

RGB-data processing unit 13*a* receives RGB data from either analog interface 12 or digital interface 12*a*. It prepares the RGB data for display, and may include whatever processing memory is useful for such tasks, such as field and line buffers. The tasks performed by RGB-data processing unit 13*a* include scaling, sharpness control, and aperture correction.

Picture quality unit 14 performs tasks such as color space conversion and de-gamma. Colorspace conversion converts Y/C data to RGB data. De-gamma undoes gamma correction in signals intended for CRT displays and is required because unlike CRTs, DMDs are linear displays with no inherent gamma characteristics.

The format and frame buffer unit 15 receives processed pixel data from picture quality unit 14. It formats the data into "bit-plane" format, and delivers the bit-planes to SLM 16. The bit-planes for each color are delivered during one third of the total frame time, which corresponds to a one-third revolution of the color wheel. As discussed in the Background, the bit-plane format permits each display element of SLM 16 to be turned on or off in response to the value of 1 bit of data at a time. The structure and operation of format and frame buffer unit 15 is further explained below in connection with FIGS. 2–4.

The bit-plane data from format and frame buffer unit 15 is delivered to SLM 16. Details of a suitable SLM 16 are set out in U.S. Pat. No. 4,956,619, entitled "Spatial Light Modulator", which is assigned to Texas Instruments Incorporated and incorporated by reference herein. Essentially, SLM 16 uses the data from the format and frame buffer unit 15 to address each display element of its display element array. The "on" or "off" state of each display element forms an image. The data for different colors (red, green, and blue) is sequentially used to display three images through the color wheel 17. The eye adds the colors displayed (or not displayed) for each pixel and perceives the desired colors.

Display optics unit 18 has optical components for illuminating SLM 16 and for projecting the image from SLM 16.

In other embodiments, system 10 may have three SLMs instead of a single SLM 16, and no color wheel. The three SLMs would each concurrently generate an image of a different color—red, green, and blue—with the images combined for a full color display.

Master timing unit 19 provides various system control functions. Timing unit 19 may be implemented with a field programmable gate array (FPGA), to handle different frame resolutions and frame rates. As stated above, it receives a control signal from analog interface 12 or from digital interface 12*a* indicating the type of input signal, so that a corresponding frame rate, line rate, and sample rate (if analog) can be selected.

Format and Frame Buffer Unit

Figure 2:
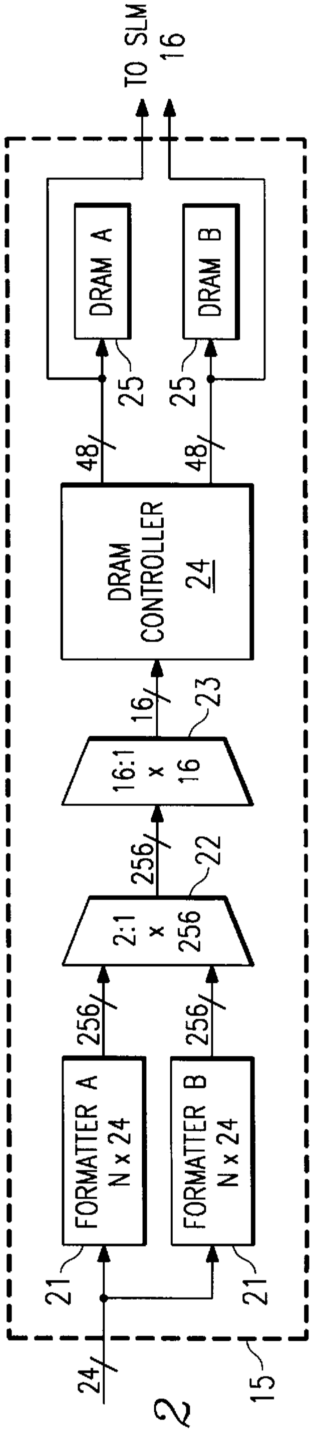
FIG. 2 is a block diagram of the format and frame buffer unit of FIG. 1.

FIG. 2 illustrates format and frame buffer unit 15 in further detail. It is comprised of two formatters 21, two multiplexers 22 and 23, a DRAM controller 24, two DRAM memories 25, and an interface for SLM 16. A feature of the invention is that the DRAM memories are comprised of conventional DRAM (dynamic random access memory) devices.

In FIG. 2, for purposes of example, bus widths and multiplexer sizes are explicitly included. However, it should be understood that these specifications may vary with different systems.

Formatters 21 operate in a "double buffer" mode, that is, they take turns receiving and outputting data. In the example of this description, where system 10 has a single SLM 16 and a color wheel 17, the multi-bit pixel data delivered to formatters 21 is 24-bit data, 8 bits each for red, green, and blue frames of data. As explained below, when one formatter 21 is full, it delivers bit-plane data to a DRAM 25 while the multi-bit pixel data is clocked into the other formatter 21.

Each formatter 21 has a structure similar to that of a FIFO memory, except that the outputs are designed to select one bit of the pixels in formatter 21 at a time. This results in the bit-plane format. For example, each output might be connected to a tri-state buffer. All bits of any one pixel are tied together to a tri-state line, allowing any one bit to be output. Other bit selection methods, such as multiplexers could be used. Various bit-selection implementations are described in U.S. patent application Ser. No. 08/333,199, referenced above, in U.S. patent application Ser. No. 08/160,344, entitled "Digital Memory for Display System Using Spatial Light Modulator", and in U.S. Pat. No. 5,255,100, entitled "Data Formatter with Orthogonal Input/Output and Spatial Reordering". All of these inventions are assigned to Texas Instruments Incorporated. Each document is incorporated herein by reference.

Formatters 21 each receive N number of pixels, and as explained below, N is sufficiently large to write multiple columns of a DRAM 25. As explained below, this feature permits the data rate necessary to fill the SLM 16 with data for a desired display resolution (number of pixels per line and number of lines), pixel resolution (number of bits per pixel), and frame rate.

In the example of this description, formatters 21 each receive 256 pixels. Thus, N=256. This capacity may also be referred to as the "pixel depth" of a formatter 21. The pixel depth may vary to some extent with the configuration of system 10. More specifically, the pixel depth may be increased or decreased in accordance with varying SLM resolutions. However, as stated above, the pixel depth must be sufficient to fill multiple columns of a DRAM 25.

A first multiplexer 22 selects outputs from one or the other of formatters 21. In the example of this description, there are 256 mux elements in multiplexer 22, each element receiving an output from one formatter 21 and an output from the other formatter 21.

A second multiplexer 23 divides the N-bit output of formatters 21 into words. In the example of this description, there are 16 mux elements in multiplexer 23, which divides the 256-bit output of formatters 21 to 16-bit words. The output of multiplexer 23 is referred to herein as "bit-plane words". In this example, each bit-plane word has one bit from each of 16 pixels, with all of the 16 bits belonging to the same bit-plane. For example, the 16 bits might all be the least significant bit of red data.

DRAM controller 24 has various functions, including the addressing of DRAMs 25. As explained below, this addressing is extended page mode addressing, where multiple columns of the same page of memory can be written without generating a page address for each column. If necessary, DRAM controller 24 also groups the bit-plane words from multiplexers 23 into properly sized memory input words. In the example of this description, DRAM controller 24 groups every three bit-plane words to create 48-bit memory input words. In other embodiments, the bit-plane word size delivered to DRAM controller 24 might already match the memory input word size.

Figure 3:
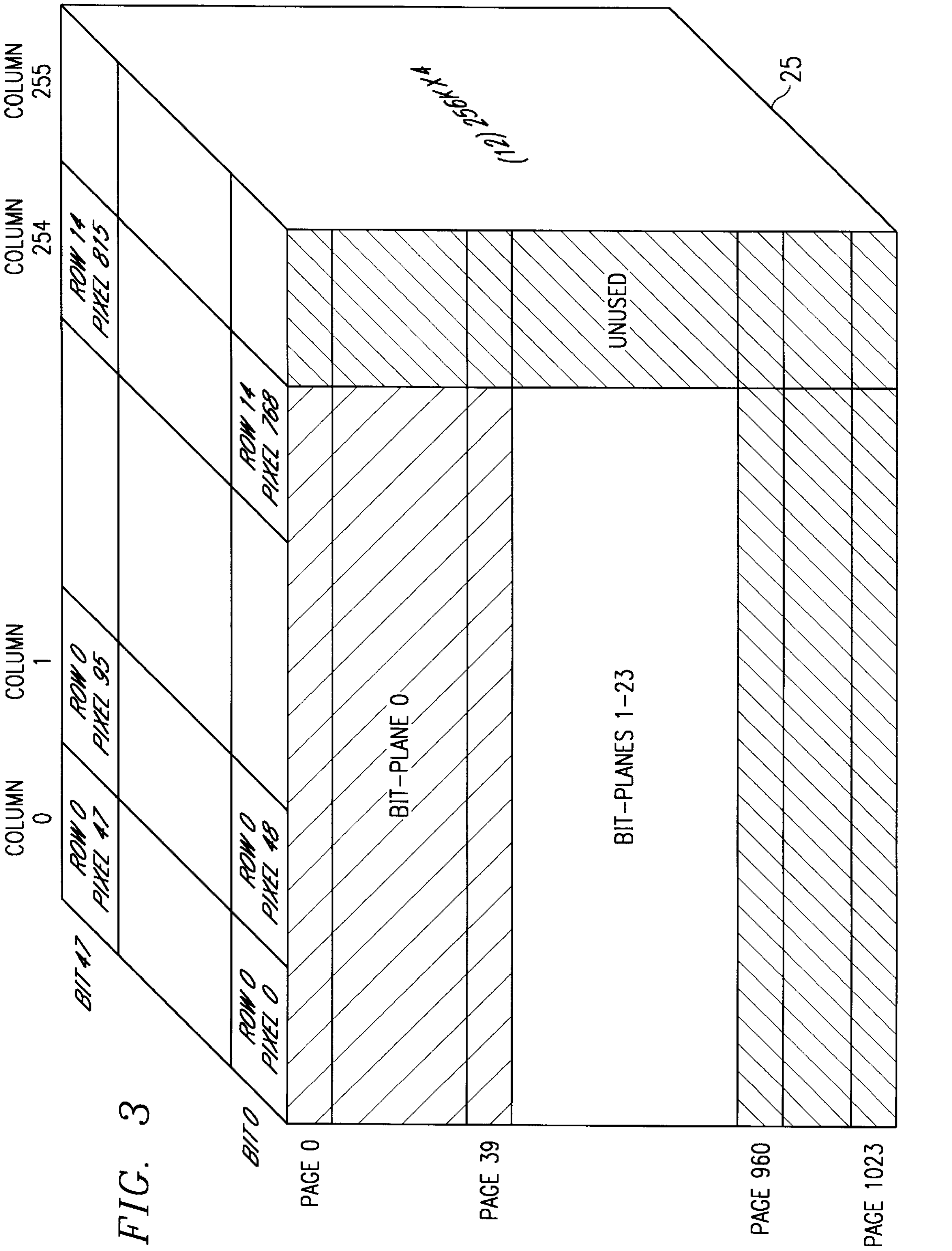
FIG. 3 illustrates one embodiment of the DRAMs of FIG. 2.

FIG. 3 illustrates one of the DRAMs 25 of FIG. 2. Consistent with the example specifications of FIG. 2, DRAM 25 is configured for an 800×600 display on SLM 16 (800 pixels per row and 600 rows). Both DRAMs 25 have identical structure. They operate in a double buffer mode, so that DRAM 25 can receive a frame of data while the other DRAM 25 delivers a frame of data to SLM 16.

As illustrated, DRAM 25 is comprised of 12 DRAM "chips" each 256K×4 bits. The depth of each DRAM chip and the number of chips provide a certain memory input word size. In the example of FIG. 3, where there are 12 chips each having a 4-bit depth, the memory input word size is 48 bits. The total size of DRAM 25 is in terms of "pages", where each page has a size determined by the memory input word size times a number of columns. For a DRAM 25 comprised of 256K×4 bit chips, there are 256 columns. Where the memory input word size is 48 bits, each page is 256×48 bits. DRAM 25 has 1024 pages.

Each bit-plane is stored in an associated number of pages. In the example of this description, each bit-plane is stored in 40 pages. For a frame of data (24 bit-planes), 960 pages are used (24 bit-planes×40 pages per bit-plane).

Referring to both FIG. 2 and FIG. 3, the length of each formatter 21 is sufficient to provide N consecutive bits of the same bit weight. These N bits are read into DRAM 25 in sequence. Where the 256 bits have been divided into 48-bit words, 6 words are used to read in these 256 bits (some bits are unused).

Because each 256 bits of data are for the same bit-plane, the 6 words containing these 256 bits can be written to the same page. For each of these words, the page address is the same and only a new column address need be generated. In other words, multiple write cycles can occur without requiring a new page address to be generated. This mode of addressing is referred to herein as "extended page mode addressing" and reduces the time required for writing data into the memory. For example, for each write cycle, instead of requiring 60 ns to generate a page and a column address, only 30 ns might be required to generate the column address.

In this example of extended page mode addressing, for bit-plane 0, a first word contains the first 48 values of bit 0 for row 0 of SLM 18. The next 5 words contain the remaining values of the 256 pixels of row 0. These 6 words use the same page address and different column addresses.

The next 256 bits will contain data for a new bit-plane. Thus, for the next 6 memory input words, a new page address is generated. However, the same page address can be used for these 6 words.

This process of writing each bit-plane for 256 pixels continues until the data for all 256 pixels is written into a DRAM 25. Then data for a next 256 pixels is written in. The writing process switches between formatters 21, each providing data for a next 256 pixels, until the DRAM 25 has received an entire frame of data.

In practice, the memory input word size and the length of formatters 21 are determined by first calculating a desired data rate for data from DRAMs 25 into SLM 16. This data rate is based on the desired resolution, frame rate, and number of bit-plane loads per frame. It is assumed that the data written into DRAMs 25 must keep up with the data being read out.

In the example of this description, a data rate of 900 Gbits per second is desired to provide an 800×600 display for a color wheel system, where all three colors must be displayed within a 60 frame per second frame rate. There are to be 10 bit-plane loads per frame (some of the bit-planes are loaded more than once and displayed a portion of their display time on each load).

From the data rate, the required DRAM bus width can be calculated. In accordance with the extended page mode writing described above, access times for this mode are assumed. In this example, an extended page mode access time of 30 ns is assumed. For example, a memory chip having only 30 ns access times might run at 33 MHz per pin, whereas a chip requiring 60 ns access times could run only half as fast. The true memory speed can be calculated for a particular length of formatters 21, which reduce to 30 ns a certain number of access times that would otherwise be 60 ns. The desired data rate can be divided by the memory speed to determine the number of output pins required. In the above example, these calculations result in a desired bus width of 48 bits (12 chips×4 pins per chip).

Figure 4:
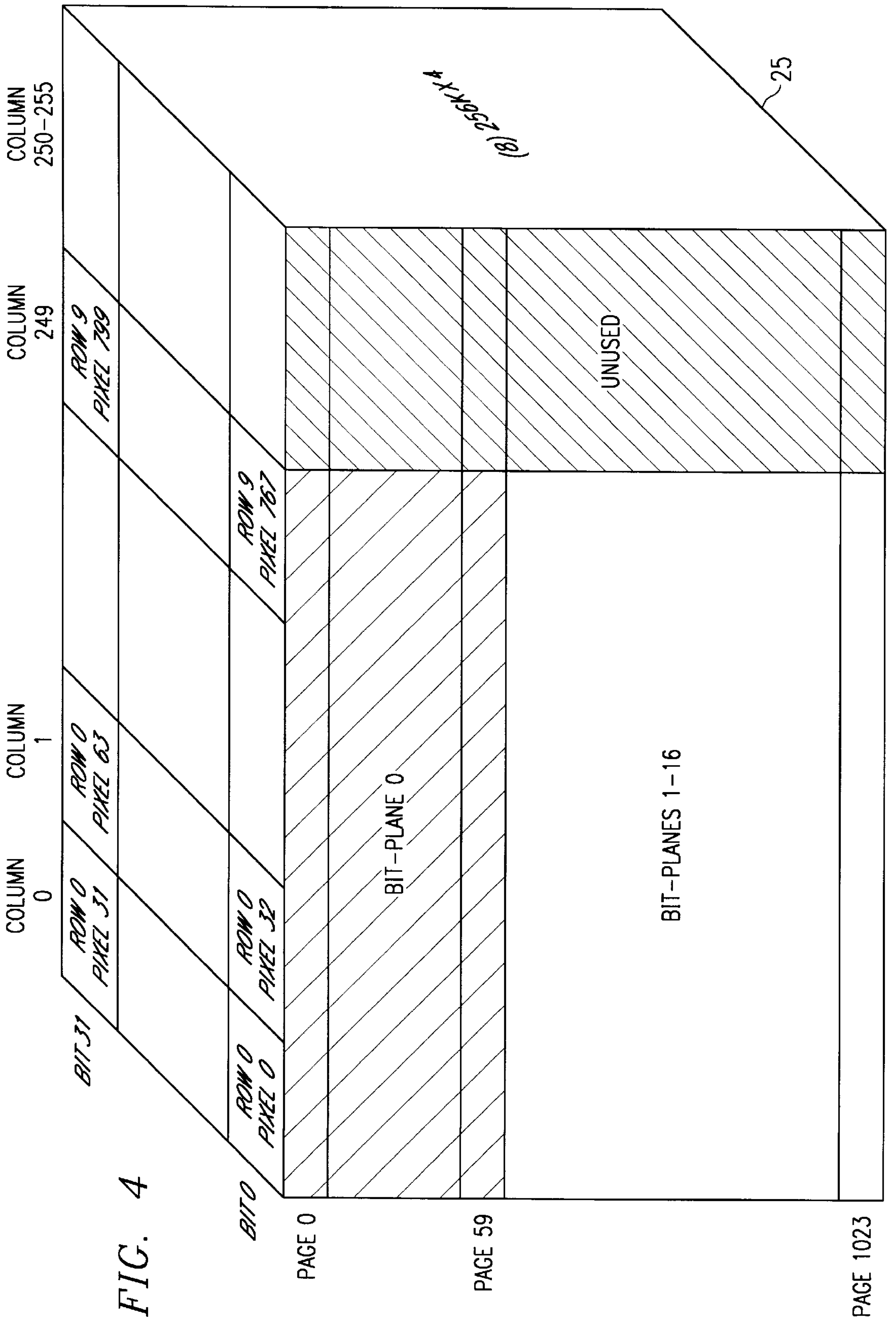
FIG. 4 illustrates an alternative embodiment of the DRAMs of FIG. 2.

FIG. 4 illustrates another example of a DRAM 25 configured for a display system having three SLMs 16. As described above in connection with FIG. 1, each SLM 16 displays an image of a different color (red, green, or blue) and the three images are combined . The red, green, and blue data follows three different data paths for delivery to a different SLM 16. In such a system, there would be three format and frame buffer units 15, one for each data path. Each unit 15 would have a structure like that of FIG. 2. Thus, in FIG. 4, DRAM 25 represents one of six DRAMS 25,two for each color.

The DRAM 25 of FIG. 4 is configured for an SLM 16 having an 800×600 resolution. It can store up to 17 bit-planes. The memory input word size is 32 bits. It is assumed that formatters 21 each have a 256 pixel depth. Thus, 256 bits of consecutive bit-plane data is delivered to DRAM 25. This permits 8 words to be written to a given page address, with only addresses for 8 new columns being required. In other words, for these 8 memory input words, only one page address need be generated. Other than differences resulting from the different memory input word size, the writing of data to DRAMs 25 is the same as described above.

The following tables illustrate how memory input word sizes may be calculated for other configurations of system 10. As in the examples described above, an extended page mode access time of 30 ns is assumed. The “realizable bus width” assumes the availability of DRAM chips having input word sizes of 4 bits, which chips are combined as in the above examples to provide memory input word sizes that are multiples of 4. The pixel depth of formatters 21 (the value of N) is a function of the time available for memory accesses during each frame.

| Video Area | Frame Rate | Bit-plane loads | Serial Data Rate (Mhz) 32/16 col/line | Bit-Rate |
|---|---|---|---|---|
| 640 × 480 | 60 Hz | 30 | 27/13 | 553 Mbits/sec |
| | 190 Hz | 10 | 28/14 | 567 Gbits/sec |
| 800 × 600 | 60 Hz | 30 | 32/16 | 864 Mbits/sec. |
| | 190 Hz | 10 | 33/17 | 900 Gbits/sec |
| 1280 × 768 | 60 Hz | 30 | 44/22 | 1.7 Gbits/sec |
| | 190 Hz | 10 | 48/24 | 1.9 Gbits/sec |

-continued

| Video Area | Frame Rate | DMD width | DRAM bus-width | Realizable bus-width |
|---|---|---|---|---|
| 640 × 480 | 60 Hz | 20/10 | 17 | 20 |
| | 190 Hz | 20/10 | 18 | 20 |
| 800 × 600 | 60 Hz | 54/27 | 27 | 28 |
| | 190 Hz | 54/27 | 28 | 28 |
| 1280 × 768 | 60 Hz | 80/40 | 52 | 60 |
| | 190 Hz | 80/40 | 58 | 60 |

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A format/buffer unit operable to deliver bit-plane data to a spatial light modulator, comprising:

a pair of formatters, each formatter receiving multi-bit pixel data for N number of pixels, such that one said formatter is operable to output N number of bits of the same weight while the other of said formatters is operable to receive a next N number of pixels;

a first multiplexer operable to select between outputs of said pair of formatters;

a second multiplexer operable to divide said N number of bits into bit-plane words;

a pair of DRAM (dynamic random access memory) frame buffer memories, operable to receive bit-plane words, each of said memories having a size determined in terms of a number of pages, each page having a size determined by a memory input word size times a number of columns, such that each of said memories is addressable by pages and columns;

wherein said memory input word size is determined by a desired data rate, and wherein N is a multiple of said input word size and is sufficiently large such that a number of said columns in the same one of said pages can be written with said N number of bits; and a DRAM controller for providing addresses for said pages and columns.

2. The format/buffer unit of claim 1, wherein said second multiplexer provides bit-plane words of the same size as received by said frame buffer memories.

3. The format/buffer unit of claim 1, wherein said second multiplexer provides bit-plane words of a different size as received by said frame buffer memories, and wherein said DRAM controller conforms said bit-plane word sizes.

4. The format/buffer unit of claim 1, wherein said formatters output said N number of bits by multiplexing the bits of each of said pixels.

5. A method of suing DRAM (dynamic random access memory) devices to provide a frame buffer operable to deliver bit-plane data to a spatial light modulator, comprising the steps of:

formatting multi-bit pixel data for N number of pixels, thereby providing N number of bits of the same weight before formatting a next N number of pixels; and dividing said N number of bits of the same weight into bit-plane words using at least one multiplexer;

writing said N number of bits as said bit-plane words to a DRAM (dynamic random access memory) frame buffer memory, said memory having a size determined in terms of a number of pages, each page having a size determined by a memory input word size times a number of columns, such that said memory is addressable by pages and columns;

where said memory input word size is determined by a desired data rate, and wherein N is a multiple of said memory input word size and is sufficiently large such that said writing step can be performed by writing to a number of said columns in the same page.

6. The method of claim 5, wherein said formatting step is performed with double buffered formatter devices.

7. The method of claim 5, wherein said writing step is performed with double buffered memory devices.

* * * * *

UNITED STATES PATENT AND TRADEMARK OFFICE

CERTIFICATE OF CORRECTION

PATENT NO. : 6,118,500
DATED : September 12, 2000
INVENTOR(S) : Adam J. Kunzman

It is certified that error appears in the above-identified patent and that said Letters Patent is hereby corrected as shown below:

Title page,
Item [60], insert -- [60] Related U.S. Application Data

Provisional Application No. 60/024,923 Aug. 30, 1996. --

Signed and Sealed this

Eleventh Day of February, 2003

JAMES E. ROGAN
*Director of the United States Patent and Trademark Office*